No. 824,900. PATENTED JULY 3, 1906.
W. A. BATES, DEC'D.
H. A. BATES, ADMINISTRATOR.
EYE TESTING INSTRUMENT.
APPLICATION FILED AUG. 20, 1903.
2 SHEETS—SHEET 2.
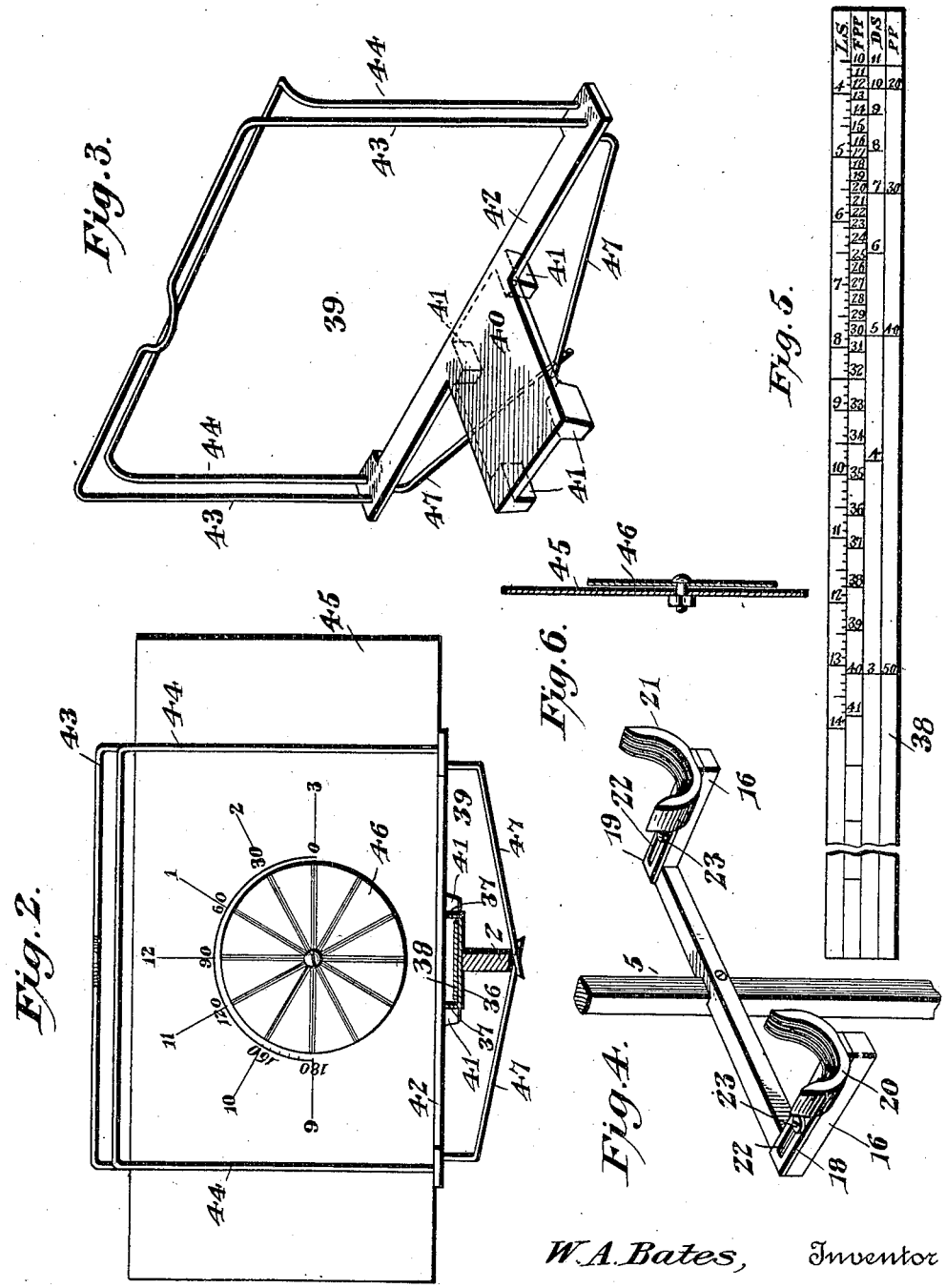
W. A. Bates, Inventor
Witnesses

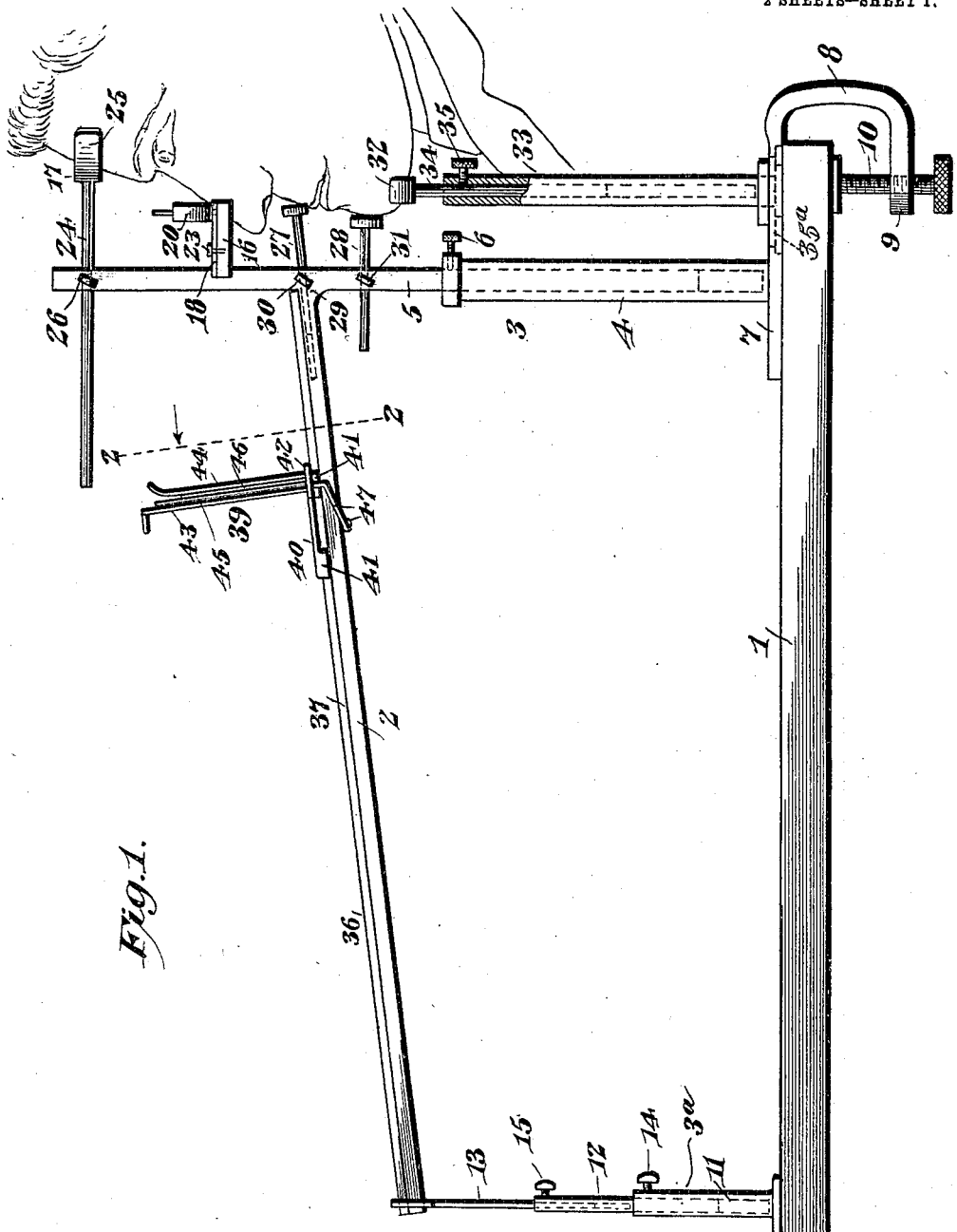

UNITED STATES PATENT OFFICE.

WILLARD A. BATES, OF PRINCETON, MAINE; HIRAM A. BATES ADMINISTRATOR OF SAID WILLARD A. BATES, DECEASED.

EYE-TESTING INSTRUMENT.

No. 824,900.            Specification of Letters Patent.            Patented July 3, 1906.

Application filed August 20, 1903. Serial No. 170,222.

*To all whom it may concern:*

Be it known that I, WILLARD A. BATES, a citizen of the United States, residing at Princeton, in the county of Washington and State of Maine, have invented a new and useful Eye-Testing Instrument, of which the following is a specification.

This invention relates to a novel eye-testing instrument designed more especially for the measurement of latent hypermetropia.

The object of the invention, aside from the production of an instrument to be utilized for general eye-testing purposes, is to provide mechanical means whereby the ciliary muscles or muscles of accommodation may be relaxed without the use of mydriatic agents when the patient is afflicted with latent hypermetropia or spasm of the accommodation and the refraction of the eye afterward determined in order to facilitate the selection of the proper lenses for the correction of the vision.

In order that the following description of the instrument may be clearly comprehended, it is desirable to state in brief the theory upon which it is predicated, so far as the measuring of latent hypermetropia is concerned. If a plus spherical lens is placed in a three-cell clip together with a plus .50 cylinder-lens, axis 0, and a minus .50 cylinder-lens, axis 90, and held in the range of solar rays, a perfect circular image of the sun will be thrown upon a screen, provided the distance between the screen and the lenses is such as will give a perfect focus. If the clip is moved nearer the screen than the focus of the spherical lens, the image will be drawn out horizontally, while if the distance is greater than a perfect focus the image will be drawn out or distorted vertically. If when the lenses and screen are in position to obtain a perfect focus, evidenced by a perfect image of the sun on the screen, we remove the cylinder-lenses, the spherical lens will be found to be in perfect focus, showing that the disturbance of the rays of the vertical meridian by the minus lens is equal to the disturbance of the rays of the horizontal meridian by the plus lens. The human eye corresponds, in effect, with the spherical lens, and consequently if we place the two cylinder-lenses above referred to before an emmetropic eye the horizontal lines of an astigmatic chart will be seen plainest if the chart is nearer than the eye can perfectly focus the rays on the retina. On the contrary, if the chart is moved away from the eye until the vertical and horizontal lines are equally distinct it will be found upon the removal of the cylinder-lens that the eye will sharply focus objects at that distance and no nearer. The point thus ascertained is the near point of perfect sharp focus on the retina. Obviously the minus cylinder-lens made the horizontal meridian hyperopic minus fifty and the plus cylinder-lens made the vertical meridian myopic plus fifty, and the astigmatism being hyperopic and myopic in the same degree the vertical and horizontal lines are equally distinct. If both the vertical and horizontal lines are equally distinct after the removal of the cylinder-lenses, the eye must be in perfect focus at that distance. The near point of distinct vision is much nearer than the near point of perfect sharp focus, as is evidenced by the fact that the eye can read much nearer than a sharp focus, as in hyperopia. An emmetrope seventy years of age has no accommodation; but with a plus 3 D lens he has 3 D's of accommodation, a sharp focus of objects at thirteen inches, and a near point of distinct vision at nine or ten inches. The determination of this new near point—to wit, the near point of perfect focus on the retina—is the foundation of one of the most important features of my instrument. This near point recedes with advancing age, as does the near point of distinct vision; but the ratio of recession is much greater. As a result of extended experiments I have ascertained the comparative retrogression of the *punctum proximum*, or near point of distinct vision, and the focus *punctum proximum*, or the near point of sharp focus, as follows:

| Age | 10 | 20 | 30 | 40 | 50 |
|---|---|---|---|---|---|
| P. P. | 7 centimeters | 10 | 14 | 20 | 33 |
| Focus P. P. | 9 centimeters | 15 | 22 | 33 | 66 |

In testing an eye in accordance with my method an astigmatic chart is placed at the near point of perfect focus, which, as indicated in the above table, will vary according to the age of the patient. Two cylinder-lenses of equal plus and minus power with their axes related, as before stated, are then placed in a lens-clip or trial-frame at the proper distance from the eye. If the vertical and horizontal lines on the chart are equally distinct, the eye is apparently emmetropic. If these lines are not alike in shade, the spherical lens that produces a corresponding shade of both the horizontal and vertical lines will constitute the measure of the error of refraction, provided the error is not latent. If, however, the eye is affected by latent hypermetropia, the muscles of accommodation and convergence are in an abnormal state of contraction and an interval of time must elapse before the eye can focus itself upon objects at different distances. This latent hypermetropic condition is thus distinguishable from emmetropia, in which the muscles move automatically and the eye focuses perfectly at any distance up to the near point of perfect focus, the distance of which from eyes of a given age is always the same. It follows logically, therefore, that if the error of refraction is eliminated the spherical lens that will correct the vision by making the vertical and horizontal lines of the chart equally distinct at the normal near point of sharp focus according to the age of the person will be the measure of the latent hypermetropia. The error of refraction may be eliminated in the usual manner, as by the use of belladonna or any other mydriatic agent; but I prefer to relax the muscles of accommodation to the extent of the abnormal contraction thereof by means of the instrument. A simple way to effect this end is to repeatedly move the chart toward and from the eye until the muscles become tired from the effort to accommodate the focus at the varying distance and finally relax. As soon as this relaxation takes place, and thus eliminates the error of refraction, the abnormal near point of perfect focus is ascertained in the manner stated and the latent hypermetropia measured and corrected by the proper lens. It will be readily understood from this description of the test for latent hypermetropia that the instrument must embody means for ascertaining the age distance of the near point of sharp or perfect focus, and preferably also the means for eliminating the error of refraction in order to facilitate the determination of the extent of the latent hypermetropia by finding the lens that will locate the near point of perfect focus at the normal distance from the eye being tested. Obviously a large variety of instruments answering these requirements might be constructed; but in the accompanying drawings I have shown one form of the instrument which I at this time consider preferable and which embodies a number of novel features in addition to those which directly contribute to the above requirements.

In the said drawings, Figure 1 is a side elevation of the instrument in use. Fig. 2 is an enlarged sectional view on the line 2 2 of Fig. 1. Fig. 3 is a detail perspective view of the chart-holder. Fig. 4 is a perspective view of the lens-holder and its support. Fig. 5 is a plan view of the scale-strip, and Fig. 6 is a sectional view through the astigmatic chart.

Like numerals of reference are employed to designate corresponding parts throughout the several views.

The instrument proper is designed to be mounted on a table or other suitable support 1 and comprises the bar 2, preferably, though not necessarily, slightly inclined from the horizontal and carried at its opposite ends by suitable supports 3 and $3^a$, by means of which the bar may be raised or lowered, and thus adjusted to accommodate the patient. This slight inclination of the bar is designed to avoid excitement of the accommodation by placing the eye in a natural position of rest. I find that such position is assumed by the eye when the usual axis is disposed at a slight downward inclination. The support 3 comprises telescoping sections 4 and 5, the former being provided with a set-screw 6 for retaining the sections in their proper relative positions and being further provided with a base 7, extended to form an approximately U-shaped bracket 8. One leg 9 of this bracket extends under the edge of the table or support 1 and is provided with a clamping-screw 10, which is screwed up against the table to securely clamp the base of the support 3 thereto. The support 3 at the outer end of the bar 2 is also composed of telescoping sections 11, 12, and 13, the latter being connected to the bar in any suitable manner, but preferably by a connection sufficiently loose to permit slight adjustment of the bar 2 relative to its support. The sections 11 and 12 are provided with set-screws 14 and 15 for securing the parts after adjustment, and the section 11 is preferably formed with a base resting upon the table. It may be stated at this point, however, that the specific character of the supports 3 and $3^a$ is not material, though it is desirable to provide for the vertical adjustment of the bar 2, and the construction shown is a simple and convenient means for attaining that end.

The upper section 5 of the front support 3 is preferably, though not necessarily, rigid with the bar 2 and is extended above the bar for the support of a lens-holder 16 and an eye-distance gage 17. The lens-support (shown in detail in Fig. 4) comprises an angular frame screwed or otherwise secured to the extension of the section 5 and carrying at its opposite ends a pair of adjustable slides 18 and 19, having lens-clips 20 and 21, which support the lenses and may be adjusted toward and from the eye and for pupilary distances by moving the slides 18 and 19 laterally and longitudinally. Any suitable provision for this adjustment may be made; but I prefer to form the slides with longitudinal slots 22 for the reception of adjusting-screws 23, passed through the slots and into the frame of the lens-holder. By loosening one of these screws the slide and lens-clip may be adjusted and rigidly retained by again tightening the screw in an obvious manner. These lens-clips are not indispensable elements of the instrument, as ordinarily the optician or other operator will employ the usual trial-frame for holding the lenses. In any event it is desirable to avoid any obstruction to the view of the patient or peep-holes, which influence the accommodation.

The bar 2 is provided with scales or significant distance indications, with respect to which the eye being tested must obviously bear a definite relation. It is for this reason that the eye-distance gage 17 is provided. This gage is practically an extension of the adjustable scale-bar 2 and comprises a shank 24, passed through the upper end of the section 5 and provided upon its front end with a curved plate 25, which engages the forehead of the patient and may be cushioned upon its inner face, if desired. This gage is adjusted for the purpose of securing the proper eye distance and is fixed in its adjusted positions by a set-screw 26. It is not essential that this gage should contact with the forehead of the patient, as it might with equal facility contact with any other portion of the head—as, for instance, the upper lip or the front of the chin. In fact, the illustrated instrument is equipped with two additional eye-distance gages 27 and 28, the former engaging the upper lip and having its shank 29 passed through the bar 5 and telescoping into the bar 2, and the latter engaging the front of the chin and passed through the bar 5 in a manner similar to the gage 17. The gages 27 and 28 are retained, respectively, by set-screws 30 and 31. Either any or all of these eye distance gages may be employed; but ordinarily the gage 17 is sufficient for all practical purposes.

In order to steady the head of a patient, a chin-rest 32 is mounted at the upper end of an adjustable support comprising telescoping sections 33 and 34, preferably of angular cross-section, to prevent the turning of the rest, the section 34 being held in its adjusted position by a set-screw 35, as shown. The lower section of the support for the chin-rest preferably rises from and is secured to the base 7 of the front support 3, said base having a slot 35$^a$, within which the chin-rest support is adjustable toward and from the support 3.

We have now seen that the instrument comprehends a bar which is preferably adjustable and with which are associated for simultaneous vertical adjustment a lens-holder and one or more eye-distance gages, which insure the proper location of the eye relative to certain distance designations which extend along the bar 2. It now remains to describe the nature of these designations, the manner in which the bar is equipped therewith, and the structure by means of which a visual test object—as, for instance, an astigmatic chart—is held in various positions relative to the eye and to the distance designations on the bar. The bar 2 is preferably of that cross-sectional contour shown in Fig. 2 and is additionally stiffened by a metallic scale-holder 36 in the form of a metallic plate considerably wider than the bar 2 and rigidly secured to the upper edge thereof in any suitable manner. This plate extends longitudinally of the bar 2, and its opposite side edges are turned up to form flanges 37, between which is retained a scale-bar 38, preferably of celluloid or other material which will form a sharp contrast for the scale designations imprinted or otherwise produced upon its upper surface.

Along the scale-holder 36 is arranged to slide a chart-holder 39, comprising a shiftable base 40, resting upon the upturned side edges of the plate or holder 36, and thus held out of contact with the upper face of the scale-plate 38. The base 40 is held against lateral movement by two pairs of depending guide-lugs 41, engaging the opposite sides of the plate 36, and the front end of said base is extended laterally in opposite directions to form a chart-support 42, from which rises a pair of bail-shaped chart-guides 43 and 44, arranged one in advance of the other and designed to retain in an approximately vertical position a test object—as, for instance, an astigmatic chart 45, preferably in the form of an oblong card (see Fig. 2) provided with a comparatively small rotatably-mounted dial 46 of ordinary character. The dimensions of the chart and its guides are such as to permit said chart to be shifted longitudinally for the purpose of bringing the dial squarely before either eye without convergence. The astigmatic dial-chart shown in the drawings includes certain novel features which I consider important. It is necessary to employ a small dial for testing close to the eye, and it is usual to provide at the margin of the dial a scale composed of figures, numbers, or other characters designating the different lines of the chart. I have found in practice that the observation of these small characters as ordinarily arranged increases the accommodation, which is undesirable. I therefore mount this small dial on a comparatively large chart or card, as shown, and on this card I arrange concentric with the dial two scales, one indicating degrees and the other indicating in comparatively large characters the various lines on the dial. By printing these latter characters on the chart at a considerable distance from the dial I am able to make them sufficiently large to permit their observation without affecting the accommodation. Preferably these line-indicating characters are located at the outer ends of the radiating lines printed on the face of the card. The chart-holder is designed to be moved along the bar of the instrument for the purpose of disposing the test object or chart opposite various scale indications, and when so adjusted is held firmly in position by any suitable means—as, for instance, retaining-springs 47, extending from the opposite ends of the chart-holder and bearing against the under side of the bar 2. (See Figs. 2 and 3.)

We are now familiar with the construction of the instrument so far as its purely mechanical details are concerned. The most important feature of the invention, however, resides in the particular character and relative arrangement of the designations on the scale-bar 38 whereby the operator is enabled without calculation or reference to anything beyond the instrument to properly position the chart in a manner to accurately ascertain the extent of latent hypermetropia in patients of different ages and the dioptric power of the lens which will correct the vision. On the scale-bar are produced four distinct scales extending longitudinally of the bar and readable crosswise thereof for the convenience of an operator standing at either side of the instrument. These scales are, first, a linear scale, (indicated by LS,) the unit of which may be inches, centimeters, or any other unit of linear measure. The next scale is the one which I believe to be original and the subdivisions of which are designed to indicate the near point of perfect focus for the different ages. This scale is designated FPP (focus *punctum proximum*.) Separated from this last-named scale, and preferably extending along the bar edge opposite the linear scale, is a third scale, the graduations of which indicate the near points of distinct vision for the different ages, attention being again directed to the fact that the near points of distinct vision and perfect focus do not coincide for any given age and that the ratio of recession of these points with advancing years is vastly different. This near-point-of-distinct-vision scale is designated by PP, (*punctum proximum*.) Between the scales FPP and PP is a fourth or dioptric scale DS, the indications of which designate the dioptric power of the lenses necessary for the correction of determined errors of refraction. Each of these scales has a special usefulness in certain classes of tests, and it is therefore desirable to equip the instrument with all of them. This is particularly true as to the scales FPP and DS and PP, because I have determined by experiment the normal relation of the near points of distinct vision and perfect focus in emmetropic eyes and the corrective power of various lenses when variations from the normal are determined. For the determination of certain errors—as, for instance, the latent hypermetropia—the scale FPP alone is effective, and a bar equipped with this single scale will include a complete embodiment of my invention in one aspect thereof. In order, however, that the test may indicate not only the extent of the latent hypermetropia, but also the dioptric power of the corrected lens, it is preferable to associate the dioptric scale with the near-point-of-perfect-focus scale regardless of whether or not the scales LS and PP are also employed.

In order that the manipulation of the instrument in conducting the test, which has been heretofore described with particularity, may be understood, the operation of the instrument in testing for latent hypermetropia may be described as follows: The chin-rest and the front and rear supports having been properly adjusted to bring the eyes of the patient opposite the lens-clips, the eye-distance gages are properly adjusted to accurately position the eye with respect to the distance between it and the graduations on the scale, and two cylinder-lenses, one plus .50, axis 0, and the other minus .50, axis 90, are placed in the lens-clip or in a trial-frame, as may be preferred. An astigmatic chart is then placed in the chart-holder, and the latter is rapidly moved toward and from the eye until the muscles of accommodation are relaxed to the extent of their abnormal contraction. The holder is then moved along the scale until the vertical and horizontal lines on the dial appear equally distinct, indicating a perfect focus. The distance between the indication on the FPP scale with which the front edge of the frame now registers and that indication on said scale which is the normal point of perfect focus for a person of the age of the one being tested will be the measure of the latent hypermetropia, and the relation of the holder to the dioptric scale will indicate the dioptric power of the lens required for the correction of the vision, the accuracy of which is demonstrated to the satisfaction of the patient by placing the proper lens in the clip and moving the chart to the normal near point of perfect focus, where both the horizontal and vertical lines on the dial should be equally distinct when viewed through the lens.

In conclusion attention may be directed to the fact that many variations of the illustrated structure other than those already mentioned may be resorted to without departing from the spirit of my invention. For instance, the scale-holder 36 and the scale-bar 38 may be omitted and the scales imprinted or produced upon the bar 2, which in this event would be widened. Likewise the scales might be disposed on opposite sides of the bar or imprinted directly on the face of the plate 36. In fine, I desire it to be distinctly understood that my invention resides in the production of an instrument for testing eyes and measuring both patent and latent defects or errors thereof and for effecting by mechanical means a condition of the muscles of accommodation which will permit the measurement of errors of refraction without the use of mydriatic agents, with their resulting inconveniences to the patient—as, for instance, in conditions of latent hypermetropia. Therefore while the illustrated embodiment of the invention is thought at this time to be preferable I do not limit myself to the structural details defined, but, on the contrary, reserve the right to effect such changes, modifications, and variations of the illustrated structure as may fall fairly within the scope of the protection prayed.

What I claim is—

1. An optical instrument comprising a bar, front and rear sectional supports therefor, one section of the front support being rigid with the bar and extended above the same, an eye-distance gage and a lens-holder both carried by said section, and a chart-holder mounted on the bar.

2. An optical instrument of the character described comprising a support, a chart-holder shiftable thereon, and a test object comprising a card shiftable laterally in the chart-holder and provided with an astigmatic dial and with enlarged characters indicating the lines on said dial.

3. An optical instrument comprising a bar, a chart-holder slidably mounted thereon, front and rear supports for said bar, a clamping-base for the front support, a chin-rest, and an adjustable support for said chin-rest, said support rising from the clamping-base of the front bar-support.

4. An optical instrument comprising a vertically-adjustable supporting member, a bar rigidly connected at its front end to said member and downwardly inclined toward its rear end, and a chart-holder slidably mounted on said bar.

5. An optical instrument comprising a bar, a vertical support rigid with the front end of the bar and extended above the same, and a horizontally-adjustable distance-gage carried by said vertical support at a point above the bar.

In testimony that I claim the foregoing as my own I have hereto affixed my signature in the presence of two witnesses.

WILLARD A. BATES.

Witnesses:
THOMAS LARNER,
PERRY E. LAY.